United States Patent
Chen et al.

(10) Patent No.: US 10,712,495 B2
(45) Date of Patent: Jul. 14, 2020

(54) BACKLIGHT FRAME STRUCTURE AND DISPLAY DEVICE

(71) Applicants: BEIJING BOE CHATANI ELECTRONICS CO., LTD., Beijing (CN); BOE TECHNOLOGY GROUP CO., LTD., Beijing (CN)

(72) Inventors: Hongqiang Chen, Beijing (CN); Tengfei Lou, Beijing (CN)

(73) Assignees: BEIJING BOE CHATANI ELECTRONICS CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/445,631

(22) Filed: Jun. 19, 2019

(65) Prior Publication Data

US 2020/0124788 A1 Apr. 23, 2020

(30) Foreign Application Priority Data

Oct. 23, 2018 (CN) .................... 2018 2 1719693 U

(51) Int. Cl.
*F21V 8/00* (2006.01)

(52) U.S. Cl.
CPC .......... *G02B 6/0088* (2013.01); *G02B 6/009* (2013.01); *G02B 6/0055* (2013.01)

(58) Field of Classification Search
CPC ..... G02B 6/0055; G02B 6/0088; G02B 6/009
See application file for complete search history.

(56) References Cited

U.S. PATENT DOCUMENTS 7,226,201 B1 * 6/2007 Li ..................... G02B 6/0088
349/58

* cited by examiner

*Primary Examiner* — Thomas M Sember

(57) ABSTRACT

A backlight frame structure and a display device are provided. The backlight frame structure includes a backlight module and a frame disposed at a periphery of the backlight module; the backlight module includes a light guide plate and a film covering a part of the light guide plate, a side of the frame facing the backlight module includes a first surface and a second surface, the first surface is opposite to the light guide plate, the second surface is opposite to the film, and the first surface of the frame has a plurality of grooves, the grooves are each recessed in a direction perpendicular to the first surface and are distributed in a direction parallel with the first surface.

12 Claims, 2 Drawing Sheets

A backlight frame structure and a display device.

BACKLIGHT FRAME STRUCTURE AND DISPLAY DEVICE

TECHNICAL FIELD

Embodiments of the present disclosure relate to a backlight frame structure and a display device.

BACKGROUND

With rapid development of display technology, requirements from the market on a performance of a backlight module becomes higher and higher. In recent years, a full-screen display with a narrow bezel design is increasingly demanded by users.

SUMMARY

On one aspect, at least one embodiment of the present disclosure provides a backlight frame structure including a backlight module and a frame disposed at a periphery of the backlight module; the backlight module includes a light guide plate and a film covering a part of the light guide plate, a side of the frame facing the backlight module includes a first surface and a second surface, the first surface is opposite to the light guide plate, the second surface is opposite to the film, and the first surface of the frame has a plurality of grooves, the grooves are each recessed in a direction perpendicular to the first surface and are distributed in a direction parallel with the first surface.

Optionally, in the backlight frame structure provided by an embodiment of the present disclosure, the grooves are equally spaced.

Optionally, in the backlight frame structure provided by an embodiment of the present disclosure, each of the grooves is a U-shaped groove or a V-shaped groove.

Optionally, in the backlight frame structure provided by an embodiment of the present disclosure, the film is disposed on a surface of the light guide plate close to the frame.

Optionally, in the backlight frame structure provided by an embodiment of the present disclosure, a depth of each of the grooves in a direction perpendicular to the first surface is greater than or equal to a thickness of the film in a direction perpendicular to the second surface.

Optionally, the backlight frame structure provided by an embodiment of the present disclosure further includes a light source disposed on a side of the light guide plate in a direction perpendicular to the frame, and the light source includes a light bar.

Optionally, the backlight frame structure provided by an embodiment of the present disclosure further includes a reflective sheet disposed on a side of the light guide plate facing away from the frame.

Optionally, in the backlight frame structure provided by an embodiment of the present disclosure, the first surface is directly opposite to a part of the light guide plate that is not covered by the film.

Optionally, in the backlight frame structure provided by an embodiment of the present disclosure, the grooves are spaced from each other in such a manner that a distribution density of the grooves is increased or decreased in a direction away from the light source.

On the other aspect, at least one embodiment of the present disclosure further provides a display device including a backlight frame structure, the backlight frame structure including a backlight module and a frame disposed at a periphery of the backlight module; the backlight module includes a light guide plate and a film covering a part of the light guide plate, a side of the frame facing the backlight module includes a first surface and a second surface, the first surface is opposite to the light guide plate, the second surface is opposite to the film, and the first surface of the frame has a plurality of grooves, the grooves are each recessed in a direction perpendicular to the first surface and are distributed in a direction parallel with the first surface.

Optionally, in the display device provided by an embodiment of the present disclosure, the grooves are equally spaced.

Optionally, in the display device provided by an embodiment of the present disclosure, each of the grooves is a U-shaped groove or a V-shaped groove.

Optionally, in the display device provided by an embodiment of the present disclosure, the film is disposed on a surface of the light guide plate close to the frame.

Optionally, in the display device provided by an embodiment of the present disclosure, a depth of each of the grooves in a direction perpendicular to the first surface is greater than or equal to a thickness of the film in a direction perpendicular to the second surface.

Optionally, the display device provided by an embodiment of the present disclosure further includes a light source disposed on a side of the light guide plate in a direction perpendicular to the frame, and the light source includes a light bar.

Optionally, the display device provided by an embodiment of the present disclosure further includes a reflective sheet disposed on a side of the light guide plate facing away from the frame.

Optionally, in the display device provided by an embodiment of the present disclosure, the first surface is directly opposite to a part of the light guide plate that is not covered by the film.

Optionally, in the display device provided by an embodiment of the present disclosure, the grooves are spaced from each other in such a manner that a distribution density of the grooves is increased or decreased in a direction away from the light source.

BRIEF DESCRIPTION OF THE DRAWINGS

In order to clearly illustrate the technical solutions of the embodiments of the present disclosure, the drawings of the embodiments will be briefly described in the following. Apparently, the described embodiments are just a part but not all of the embodiments of the present disclosure. Based on the described embodiments herein, those skilled in the art can obtain other embodiment(s), without any inventive work, which should be within the scope of the present disclosure.

DETAILED DESCRIPTION

The technical solutions in the embodiments of the present disclosure will be clearly and completely described below in connection with the accompanying drawings in the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Figure 1:
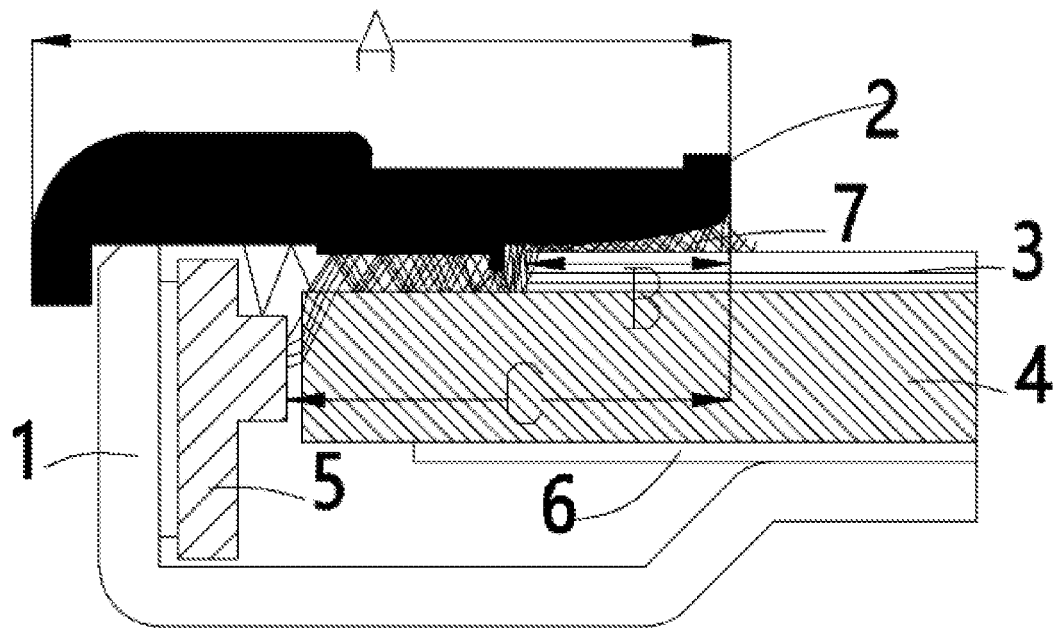
FIG. 1 is a schematic structural view illustrating a backlight frame structure.

FIG. 1 illustrates a backlight frame structure, including a back plate 1, a frame 2, a film 3, a light guide plate 4, a light bar 5, and a reflective sheet 6. The frame 2 usually has a certain gap (GPA) with the light guide plate 4 and the film 3, for example, a gap 2 of 0.15 mm to 0.35 mm. In this case, light 7 emitted from the light bar 5 may exit through the gap between the frame 2 and the film 3 upon being reflected by the reflective sheet 6 and the frame 2, resulting in a light leakage. As illustrated in FIG. 1, A indicates a length of the frame 2, C indicates a distance from the light bar 5 to an edge of the frame 2, and B indicates a length of a part of the film 3 blocked by the frame 2. In order to prevent leakage of the light 7, it is necessary to increase a shade of the frame 2 on the film 3, which makes it difficult to further reduce the value of C, and in turn makes it difficult to further realize a design of narrow bezel.

Figure 2:
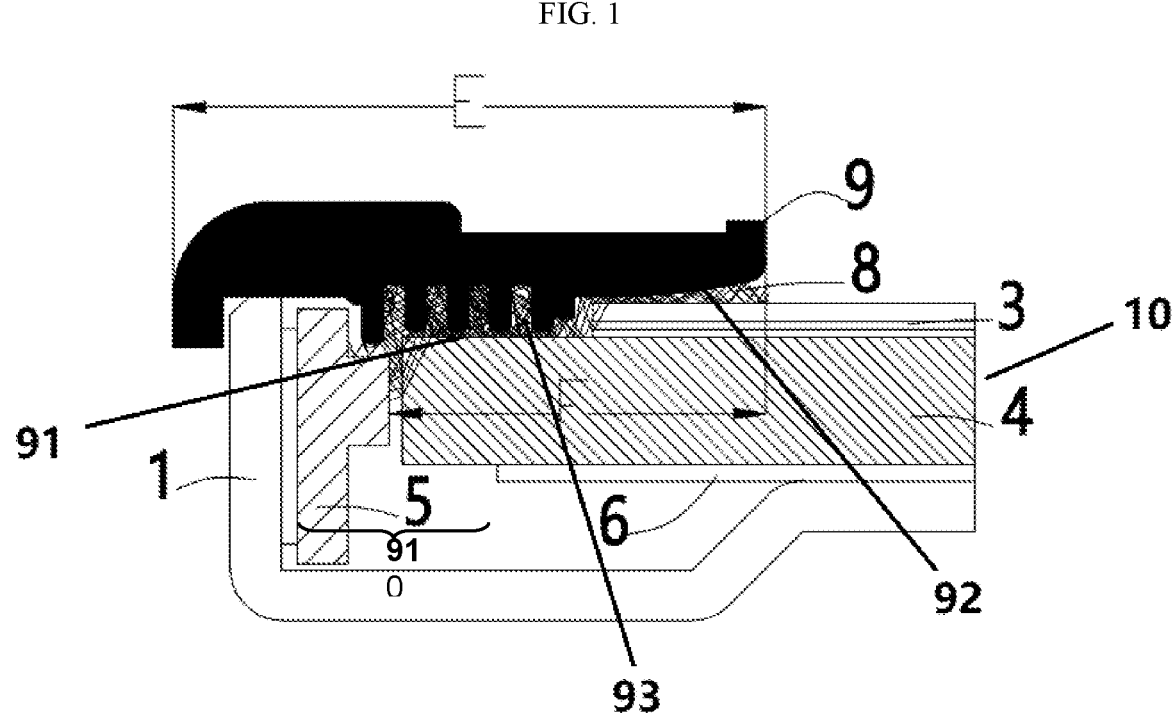
FIG. 2 is a schematic, structural view illustrating a backlight frame structure provided by an embodiment of the present disclosure.

FIG. 2 illustrates a backlight frame structure provided by an embodiment of the present disclosure. As illustrated in FIG. 2, the backlight frame structure includes a backlight module 10 and a frame 9 disposed at a periphery of the backlight module 10. The backlight module 10 includes a light guide plate 4 and a film 3 covering a part of the light guide plate 4.

Referring to FIG. 2, in the embodiment of the present disclosure, the film 3 is disposed on a surface of the light guide plate 4 close to the frame 9 (illustrated as being located above the light guide plate 4 in FIG. 2) and covers a part of the light guide plate 4.

Referring to FIG. 2, in an embodiment of the present disclosure, the backlight module 10 may further include a light source 5 and a reflective sheet 6. The light source 5 is disposed on a side of the light guide plate 4 (illustrated as a left side of the light guide plate 4 in FIG. 2) in a direction perpendicular to the light guide plate 4, and the light source 5 may be, for example, a light bar 5. Light emitted from the light bar 5 passes through the light guide plate 4 and is refracted to the frame 9. The reflective sheet 6 is disposed on a surface of the light guide plate 4 facing away from the frame 9 (illustrated as being located below the light guide plate 4 in FIG. 2).

Referring to FIG. 2, in an embodiment of the present disclosure, a side of the frame 9 facing the backlight module 10 includes a first surface 91 and a second surface 92, the first surface 91 is opposite to the light guide plate 4, and the second surface 92 is opposite to the film 3.

In an example, the frame 9 is disposed above the backlight module 10, and the first surface 91 of the frame 9 is directly opposite to a part of the light guide plate 4 that is not covered by the film 3. The second surface 92 of the frame 9 is directly opposite to the film 3.

In the embodiment of the present disclosure, the first surface 91 of the frame 9 has a plurality of grooves 93 configured to allow light emitted from a light incident side of the backlight module (for example, the light source 5) to be reflected for multiple times in each of plurality of grooves 93, so that light leaking from a gap between the frame 9 and the backlight module 10 is reduced as much as possible.

In an example, referring to FIG. 2, the first surface 91 is provided with a plurality of grooves 93, these grooves 93 each are recessed in a direction perpendicular to the first surface 91 and are distributed in a direction parallel with the first surface 91. In this case, light emitted from the light bar 5 passes through the light guide plate 4 and enters the plurality of grooves 93 to be reflected for multiple times in the plurality of grooves 93 to weaken an intensity of the light, so that an intensity of light 8 exiting from the gap between the frame 9 and the backlight module 10 is poor, thereby reducing the possibility of light leakage of the backlight module. At the same time, because the intensity of the light 8 can be sufficiently weakened, a distance F from the light bar 5 to an edge of the frame can be reduced in design, and a length E of the frame can be shortened, thereby realizing a design of a backlight module with a narrow bezel.

Figure 3:
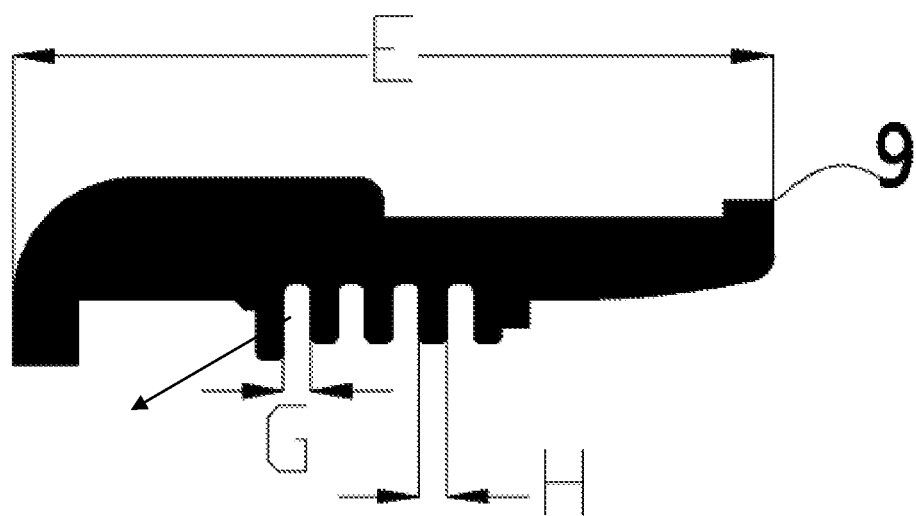
FIG. 3 is a schematic structural view illustrating a frame in a backlight frame structure provided by an embodiment of the present disclosure.

In an example, referring to FIG. 3, the grooves 93 are equally spaced from each other. However, those skilled in the art should be appreciated that, in some other examples, the grooves 93 may also be differently spaced from each other; or, the grooves 93 may be spaced from each other in such a manner that a distribution density of the grooves 93 is increased or decreased in a direction away from the light source 5, which is not particularly limited in the embodiments of the present disclosure, as long as the effect of increasing a reflection path of the light and consuming energy of the light can be achieved.

In an example, referring to FIG. 3, a thickness H of a wall of the groove 93 may be in the range from 0.1 mm to 0.3 mm. However, it should be understood by those skilled in the art that the thickness H of the wall of the groove can be designed according to a process time while satisfying the minimum limit of size of the injection molding process, without particularly limited herein.

In an example, referring to FIG. 3, a width G of the groove may be in the range from 0.5 mm to 1 mm. However, it should be understood by those skilled in the art that the width G of the groove can be adjusted according to the light intensity and the required frame width, without particularly limited herein.

In an example, referring to FIG. 3, the groove 93 is a U-shaped groove. However, it should be understood by those skilled in the art that the groove may also be a V-shaped groove or a groove of other shapes, and shapes of these grooves may be different from each other, which is not particularly limited in the embodiments of the present disclosure, as long as the effect of increasing a reflection path of the light and consuming energy of the light can be achieved.

Furthermore, although grooves 93 having substantially the same depth are illustrated in FIG. 3, those skilled in the art should also be appreciated that, in some other examples, these grooves 93 may have different depths from each other, or, grooves 93 having different depths may be disposed alternately, which is not particularly limited in the embodiments of the present disclosure, as long as the effect of increasing a reflection path of the light and consuming energy of the light can be achieved.

Based on the same inventive concept, an embodiment of the present disclosure further provides a display device including the backlight frame structure as described in any of the above embodiments or examples, and thus the display device also has the above structural features, functional features and advantages of the backlight frame structure, without repeated herein.

Embodiments of the present disclosure provide a backlight frame structure and a display device including the backlight frame structure, the backlight frame structure includes a backlight module and a frame disposed at a periphery of the backlight module; the backlight module includes a light guide plate and a film covering a part of the light guide plate; a side of the frame facing the backlight module includes a first surface and a second surface; the first surface is opposite to the light guide plate; the second surface is opposite to the film; the first surface of the frame has a plurality of grooves, so that light emitted from a light incident side of the backlight module is reflected for multiple times in the plurality of grooves. In the embodiments of the present disclosure, by providing a plurality of grooves in the first surface of the frame close to the light guide plate, an intensity of light can be weakened upon being reflected for multiple times in the plurality of grooves, thereby reducing a width of the frame while ensuring a decrease or even an elimination of light leakage.

The above are only specific implementations of the present disclosure, the protection scope of the present disclosure is not limited thereto. Any modifications or substitutions easily occur to those skilled in the art within the technical scope of the present disclosure should be fallen within the protection scope of the present disclosure. Therefore, the protection scope of the present disclosure should be based on the protection scope of the claims and the equivalents thereof.

The application claims priority to the Chinese patent application No. 201821719693.X filed on Oct. 23, 2018, the entire disclosure of which is incorporated herein by reference as part of the present application.

What is claimed is:

1. A backlight frame structure, comprising a backlight module and a frame disposed at a periphery of the backlight module, wherein
the backlight module comprises a light guide plate and a film covering a part of the light guide plate,
a side of the frame facing the backlight module comprises a first surface and a second surface, the first surface is opposite to the light guide plate, and the second surface is opposite to the film, and
the first surface of the frame has a plurality of grooves, the grooves are each recessed in a direction perpendicular to the first surface and are distributed in a direction parallel with the first surface,
the backlight frame structure further comprising a light source disposed on a side of the light guide plate in a direction perpendicular to the frame, wherein the light source comprises a light bar, wherein
the grooves are spaced from each other in such a manner that a distribution density of the grooves is increased or decreased in a direction away from the light source.

2. The backlight frame structure according to claim 1, wherein each of the grooves is a U-shaped groove or a V-shaped groove.

3. The backlight frame structure according to claim 1, wherein the film is disposed on a surface of the light guide plate close to the frame.

4. The backlight frame structure according to claim 1, wherein a depth of each of the grooves in a direction perpendicular to the first surface is greater than or equal to a thickness of the film in a direction perpendicular to the second surface.

5. The backlight frame structure according to claim 1, further comprising a reflective sheet disposed on a side of the light guide plate facing away from the frame.

6. The backlight frame structure according to claim 1, wherein the first surface is directly opposite to a part of the light guide plate that is not covered by the film.

7. A display device, comprising a backlight frame structure, the backlight frame structure comprising a backlight module and a frame disposed at a periphery of the backlight module, wherein
the backlight module comprises a light guide plate and a film covering a part of the light guide plate,
a side of the frame facing the backlight module comprises a first surface and a second surface, the first surface is opposite to the light guide plate, and the second surface is opposite to the film, and
the first surface of the frame has a plurality of grooves, the grooves are each recessed in a direction perpendicular to the first surface and are distributed in a direction parallel with the first surface,
the backlight frame structure further comprising a light source disposed on a side of the light guide plate in a direction perpendicular to the frame, wherein the light source comprises a light bar, wherein
the grooves are spaced from each other in such a manner that a distribution density of the grooves is increased or decreased in a direction away from the light source.

8. The display device according to claim 7, wherein each of the grooves is a U-shaped groove or a V-shaped groove.

9. The display device according to claim 7, wherein the film is disposed on a surface of the light guide plate close to the frame.

10. The display device according to claim 7, wherein a depth of each of the grooves in a direction perpendicular to the first surface is greater than or equal to a thickness of the film in a direction perpendicular to the second surface.

11. The display device according to claim 7, further comprising a reflective sheet disposed on a side of the light guide plate facing away from the frame.

12. The display device according to claim 7, wherein the first surface is directly opposite to a part of the light guide plate that is not covered by the film.

* * * * *